(12) United States Patent
Lee (10) Patent No.: US 9,035,575 B2
(45) Date of Patent: May 19, 2015

(54) LED LIGHTING DEVICE WITH IMPROVED MODULATION DEPTH

(71) Applicant: Dong-Won Lee, Suwon-si (KR)

(72) Inventor: Dong-Won Lee, Suwon-si (KR)

( * ) Notice: Subject to any disclaimer, the term of this patent is extended or adjusted under 35 U.S.C. 154(b) by 306 days.

(21) Appl. No.: 13/760,602

(22) Filed: Feb. 6, 2013

(65) Prior Publication Data

US 2014/0139125 A1    May 22, 2014

(30) Foreign Application Priority Data

Nov. 22, 2012  (KR) .................... 10-2012-0132885
Nov. 27, 2012  (KR) .................... 10-2012-0135597
Dec. 1, 2012   (KR) .................... 10-2012-0138630

(51) Int. Cl.
*H05B 37/00* (2006.01)
*H05B 33/08* (2006.01)

(52) U.S. Cl.
CPC ........... *H05B 33/0824* (2013.01); *Y02B 20/341* (2013.01)

(58) Field of Classification Search
CPC ........... H05B 33/0815; H05B 33/0821; H05B 33/0824; H05B 33/0827; H05B 33/083
USPC ......... 315/291, 312, 313, 314, 315, 317, 319, 315/320, 322
See application file for complete search history.

(56) References Cited

U.S. PATENT DOCUMENTS

| | | | |
|---|---|---|---|
| 6,989,807 B2 | 1/2006 | Chiang | |
| 7,723,926 B2 * | 5/2010 | Mednik et al. | ................ 315/291 |
| 7,936,135 B2 | 5/2011 | Hum | |
| 8,026,673 B2 | 9/2011 | Lys | |
| 8,044,609 B2 * | 10/2011 | Liu | ................ 315/291 |
| 8,134,303 B2 | 3/2012 | Lys | |
| 8,487,547 B2 * | 7/2013 | Godbole | ................ 315/291 |
| 8,519,635 B2 * | 8/2013 | Lin | ................ 315/291 |
| 8,638,045 B2 * | 1/2014 | Kunst et al. | ................ 315/291 |
| 2011/0095704 A1 | 4/2011 | Moussakov et al. | |
| 2011/0248640 A1 | 10/2011 | Welten | |
| 2012/0280628 A1 | 11/2012 | Jin | |

FOREIGN PATENT DOCUMENTS

| | | |
|---|---|---|
| JP | 2006-147933 | 6/2006 |
| JP | 2010-086943 | 4/2010 |
| JP | 2012-04-26 | 4/2012 |
| JP | 2012-084489 | 4/2012 |
| KR | 1020050064391 | 6/2005 |
| KR | 1020070002802 | 1/2007 |
| KR | 101083782 | 11/2011 |
| KR | 101110380 | 1/2012 |
| KR | 1020120041093 | 4/2012 |
| KR | 1020120074502 | 7/2012 |
| WO | 2013021320 | 2/2013 |

* cited by examiner

*Primary Examiner* — Jeffrey Zweizig
(74) *Attorney, Agent, or Firm* — IPLA P.A.; James E. Bame (57) ABSTRACT

A lighting device using an LED is provided where an LED lighting device having an improved modulation depth which is calculated with the maximum value and the minimum value of an amount of instantaneous light emission in an AC-driven LED lighting device having an LED turned on and off by using an instantaneous AC voltage periodically varied with time.

10 Claims, 11 Drawing Sheets

FIG. 1

Prior Art

LED LIGHTING DEVICE WITH IMPROVED MODULATION DEPTH

CROSS REFERENCES

Applicant claims foreign priority under Paris Convention to Korean Patent Application Nos. 10-2012-0132885 filed 22 Nov. 2012, 10-2012-0135597 filed 27 Nov. 2012, and 10-2012-0138630 filed 1 Dec. 2012, with the Korean Intellectual Property Office, where the entire contents are incorporated herein by reference.

BACKGROUND

The present invention relates to a lighting device using an LED. More particularly, the present invention relates to an LED lighting device having an improved modulation depth which is calculated with the maximum value and the minimum value of an amount of instantaneous light emission in an AC-driven LED lighting device having an LED turned on and off by using an instantaneous AC voltage periodically varied with time.

A light emitting diode (LED), which is an electrophotic-conversion semiconductor device of emitting light when an electrical current flows therethrough, has been widely used as a backlight of a display device. As technology has been recently advanced, the electrophotic-conversion efficiency of the LED has been higher than those of glow lamps and fluorescent lamps, so that the LED has been widely used in general lighting applications.

As technologies for driving an LED lighting device, several AC-driven LED lighting devices which turn LEDs on and off by using an instantaneous AC voltage periodically varied with time have been developed.

Examples of the AC-driven LED lighting device are disclosed in U.S. Pat. Nos. 6,989,807 and 7,936,135, Japanese Patent No. 4581646, Japanese Patent Publication No. 2009-260505, Korean Patent publication Nos. 10-2011-0019213 and 10-2010-0136362 and Korean Patent No. 10-1110380 issued to an applicant of the present invention.

Hereinafter, problems of the prior art will be described with reference to FIGS. 1 and 2.

Figure 1:
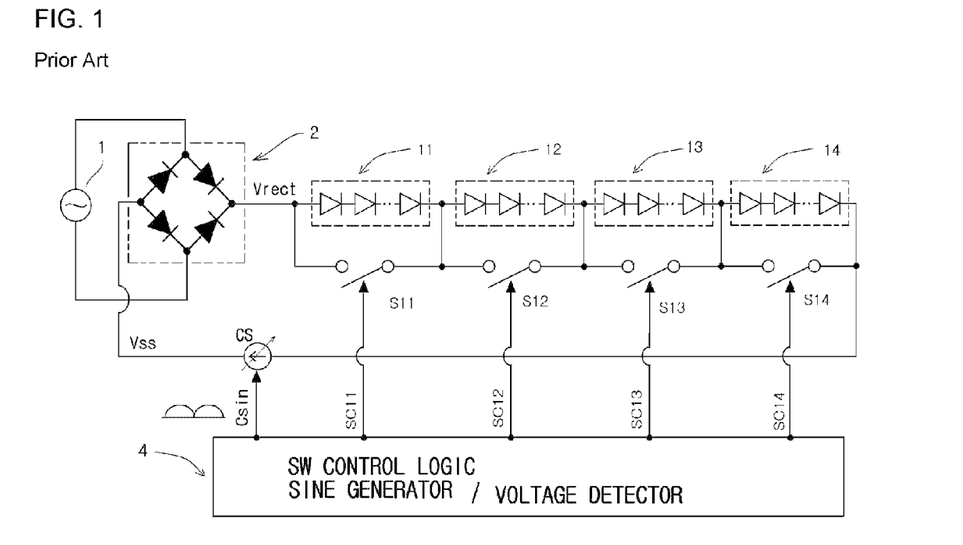
FIG. 1 is a circuit view according to the related art.
Figure 2A:
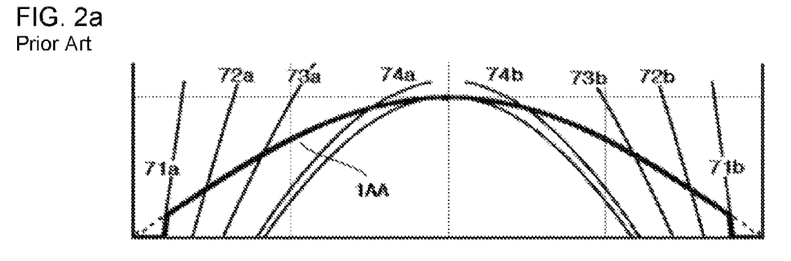
FIGS. 2a-2d are views showing a waveform of current according to the related art.
Figure 2B:
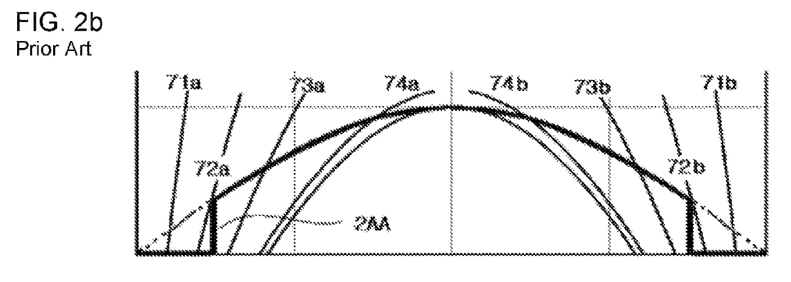
Figure 2C:
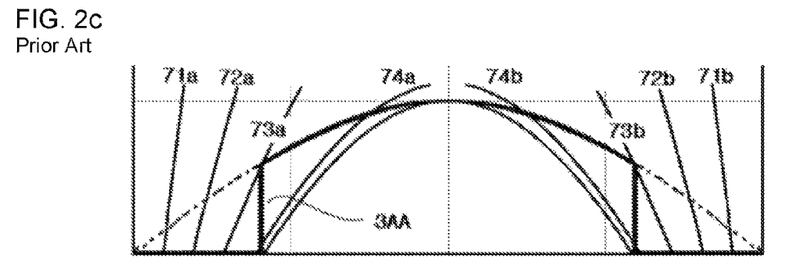
Figure 2D:
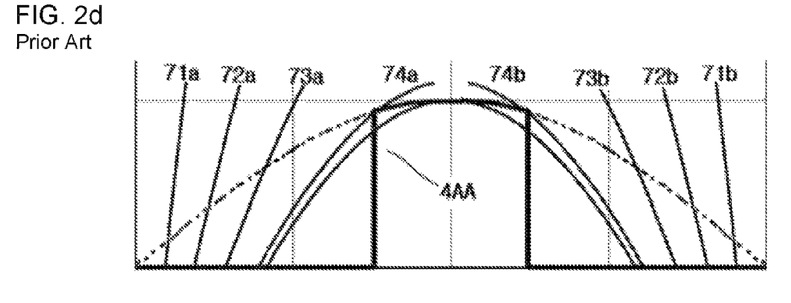

As shown in FIG. 1 (FIG. 15 of KR 10-1110380), an LED lighting device according to the related art includes an AC power source 1 for supplying AC voltage, a rectifier circuit 2 for rectifying the AC voltage, a plurality of LED blocks 11 to 14 connected in series to each other, bypass switches S11 to S14, each of which is connected in parallel to each of the LED blocks 11 to 14 to bypass current, a current source CS for limiting an amount of instantaneous AC current, and a controller 4.

At a specific time point of instantaneous AC voltage periodically varied with time, the circuit operates as follows:

1) The number of serially connected LED blocks 11 to 14 is controlled such that the serially connected LED blocks 11 to 14 are turned on with the instantaneous AC voltage at the specific time point of instantaneous AC voltage; and 2) The current source CS for limiting power current is controlled with a sine wave C sin in order to improve the power factor.

FIGS. 2a-2d (FIG. 18 of KR 10-1110380) are views showing currents flowing through each of the LED blocks 11 to 14 in the circuit of FIG. 1. In FIGS. 2a-2d, a current having a waveform 1AA flows through the LED block which is first turned on and a current having a waveform 4AA flows through the LED block which is lastly turned on.

It can be understood from current waveforms 1AA to 4AA flowing through the LED blocks that there exist sections where the current does not flow. Specifically, during the section where the current having the waveform 1AA is '0 (zero)' (which is near the phase of 0° and 180° of the AC voltage, that is, portions corresponding to voltages less than the threshold voltage of one LED block), the currents having other current waveforms are also '0' (zero).

That is, there exists a section (time) where light is not emitted. When the modulation depth is calculated with the maximum value and the minimum value of an amount of instantaneous light emission, the modulation depth becomes 100%.

Compared with 6% and 25%~40% of the modulation depths of general glow and fluorescent lamps, the modulation depth of 100% is too high.

SUMMARY

The present invention has been made to solve the above problems occurring in the related art, and an object of the present invention is to provide an LED lighting device in which a current is supplied to at least one LED block near the phases of 0° and 180° of the AC voltage to emit a light, so that the modulation depth is improved.

In order to accomplish the above object, there is provided an LED lighting device having an improved modulation depth. The LED lighting device includes a rectifier circuit for converting an AC voltage into a rectified DC voltage by rectifying the AC voltage; at least one LED block; at least one light emitting block including a condenser connected in parallel to the LED block; a current source for limiting a current provided to the light emitting blocks connected to each other in series; a switch block including at least one switch for bypassing a current flowing through the light emitting block; and a controller for controlling the switch block and the current source, wherein a switching change of the switch block is performed based on an instantaneous rectified voltage, and the LED lighting device comprises a circuit configured to allow a discharge current of the condenser to flow into the LED block and to prevent the discharge current from flowing into other circuits through the switch.

Preferably, the controller controls the current source by using a sine wave signal having a phase equal to a phase of the AC voltage.

Preferably, the controller changes a control amount of the current source in order to provide a step waveform current to the light emitting block when the switch of the switch block is switched.

Preferably, the LED lighting device further includes a discharge circuit for forcibly discharging the condenser when a preset time elapses after the AC voltage is shut off.

Preferably, the LED lighting device further includes a shut-off circuit for shutting off a current supplied from the condenser into the LED block by separating the condenser and the LED block from each other when a voltage of the condenser is equal to or less than a reference value due to shut-off of the AC voltage.

Preferably, the switch of the switch block is connected in series, parallel, or series-parallel to the LED block.

According to the present invention, the LED lighting device having an improved modulation depth supplies a current to at least one LED block at near the phases of 0° and 180° of the AC voltage to emit a light, so that the modulation depth can be improved.

DETAILED DESCRIPTION OF THE EMBODIMENTS

Hereinafter, the exemplary embodiments of the present invention will be described with reference to accompanying drawings.

The same reference numerals will be assigned to the same elements in the accompanying drawings.

Terms and words used in the specification and the claims described below shall not be interpreted as commonly-used dictionary meanings, but shall be interpreted as to be relevant to the technical scope of the invention based on the fact that the inventor may property define the concept of the terms to explain the invention in best ways.

Detailed descriptions of well-known functions and structures incorporated herein may be omitted when they make the subject matter rather unclear.

The main concept of the present invention described below is to add a condenser in parallel to an LED block in which a current flowing through the LED block is controlled by a switch. Thus, when a current is not directly supplied from an AC power source to the LED block, the LED block is turned on with a current supplied from the condenser connected in parallel to the LED block.

Therefore, there is provided the LED lighting device having an improved modulation depth by preventing all LED blocks from being unable to simultaneously turn on. By adopting a current source of limiting a power current, the LEDs are protected and at the same time, a high power factor is obtained.

Hereinafter, the LED lighting device having an improved modulation depth according to the present invention will be described in detail with reference to FIGS. 3 and 4.

Figure 3:
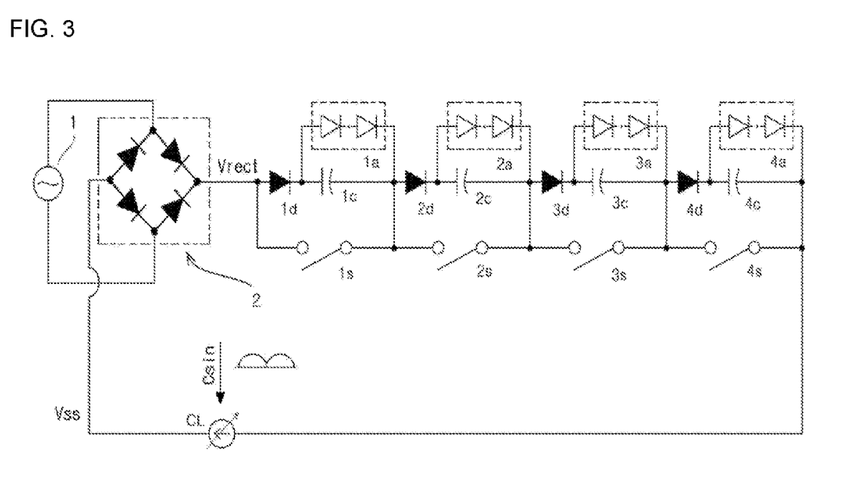
FIG. 3 is a circuit view according to one example of the present invention.

FIG. 3 is a view showing a circuit of an LED lighting device having an improved modulation depth according to one embodiment of the present invention.

As shown in FIG. 3, the present invention includes an AC power source 1 for supplying an AC voltage, a rectifier circuit 2 for rectifying the AC voltage, and first to fourth LED blocks 1a to 4a serving as a load.

Specifically, the LED lighting device includes first to fourth condensers 1c to 4c and first to fourth discharge-protection diodes 1d to 4d for protecting the currents from flowing through other circuits except for the LED blocks when the condensers are being discharged.

Further, the LED lighting device includes first to fourth bypass switches 1s to 4s for bypassing currents passing through the LED blocks, respectively, and a current source CL for limiting an amount of power current. The LED blocks and the current source CL are connected in series between a rectified voltage Vrect and the ground Vss.

Here, one circuit including the first LED block 1a, the first discharge-protection diode 1d and the first condenser 1c is called "the first light emitting block". Likewise, other circuits are called "the second light emitting block", "the third light emitting block", and "the fourth light emitting block".

In general, the circuit including the $N^{th}$ LED block Na, the $N^{th}$ discharge-protection diode Nd and the $N^{th}$ condenser Nc may be called "the $N^{th}$ light emitting block". Further, "the first light emitting block" to "the $N^{th}$ light emitting block" connected to each other in series are called loads.

Each of the first LED block 1a to the fourth LED block 4a may include at least one LED. The plurality of LEDs may be configured such that the LEDs are connected in series, parallel or series-parallel to each other. Since each LED block is generally known in the art, the detailed description thereof will be omitted below.

Preferably, the LED lighting device includes a controller (not shown). The controller generates a sine wave signal which is in phase with the AC voltage. The generated sine wave signal is rectified and the amplitude of the rectified signal is controlled, such that a current control signal C sin is generated. The control signal C sin is provided to the current source CL for limiting the current amount of the power source.

The reason for allowing the controller to generate the sine wave signal in phase with the AC voltage is that the power factor is improved when the AC current supplied from the AC power source 1 has a sine waveform and is in phase with the AC voltage.

If the condition of supplying a current corresponding to the control signal C sin provided from the controller is satisfied (that is, a sufficient current flows through the load), a voltage drop occurs between both terminals of the current source CL, so that the voltage between both terminals of the load is reduced, so the current flows through the load at a requested level.

To the contrary, if the condition is not satisfied (that is, the current flowing through the load is less than the requested current), the voltage between both terminals of the current source CL is minimized (that is, the current source has a saturation voltage), so that the maximum current flows through the load.

That is, if an instantaneous rectified voltage is higher than a design voltage, the surplus voltage is applied to the current source CL and the design voltage is applied to the load, so that the load current is limited by the current source CL.

The detailed description about the operation of the current source CL is disclosed in more detail in Korean Patent No. KR 10-1110380 filed by the applicant of the present invention.

Hereinafter, the LED lighting device having an improved modulation depth according to the present invention will be described with reference to FIGS. 4a-4b.

The modulation depth (which is also referred to as 'percent flicker') is calculated by using the maximum and minimum values of the instantaneous light emission amount and obtained from the equation of [(Maximum value−Minimum value)/(Maximum value−Minimum value)×100]. The detailed description about the modulation depth is disclosed in more detail in Korean Patent Publication No. 10-2012-0045950 filed by the applicant of the present invention.

First, the operation of the circuit during the rising term (that is, between the voltage phases of 0° and 90°) of the rectified voltage will be described.

Figure 4A:
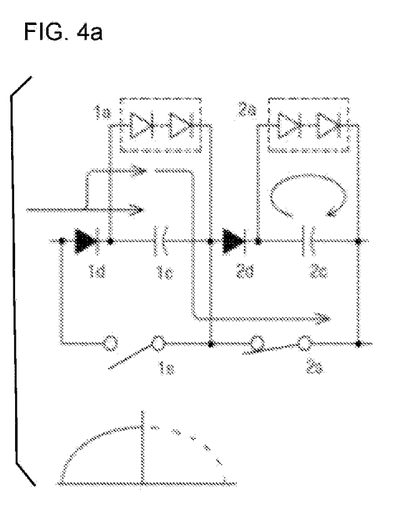
FIGS. 4a-4b are views showing a current flowing through a circuit according to the present invention.
Figure 4B:
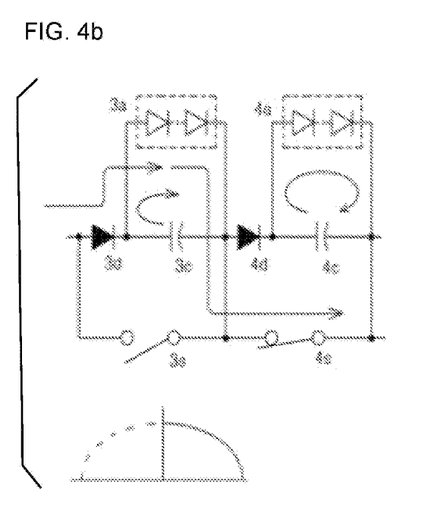

In FIGS. 4a-4b, since the first bypass switch 1s is open circuited, the power source current is directly supplied to the first light emitting block. After the power source current passes through the first discharge-protection diode 1d, the power source current is divided into two currents, one of which is charged into the first condenser 1c and the other of which passes through the first LED block 1a to be provided to a next light emitting block.

At this time, since the rectified voltage is increased as the phase of the voltage is increased, the first condenser 1c is continuously charged with the current so that the voltage of the first condenser 1c is increased. Since the first condenser 1c is maximally charged at the voltage phase of 90°, the voltage between both terminals of the first condenser 1c is maximized. [The current of the first discharge protection diode 1d=the charge current of the first condenser 1c+the current of the first LED block 1a].

In FIGS. 4a-4b, since the second bypass switch 22s is short circuited, the current passing through the first light emitting block bypasses the second light emitting block. The current which is previously charged in the second condenser 2c is discharged through the second LED block 2a connected in parallel with the second condenser 2c. Thus, even if the power source current is not directly provided, the second LED block 2a is turned on.

At this time, the second discharge protection diode 2d performs a function of allowing the discharge current of the second condenser 2c to flow only through the second LED block 2a connected in parallel with the second condenser 2c without flowing through the second switch 2s.

If the second discharge protection diode 2d does not exist, the second condenser 2c is rapidly discharged through the second bypass switch 2s. [The current of the second diode 2d=0, the discharge current of the second condenser 2c=the current of the second LED block 2a].

That is, although the discharge current of the second condenser 2c flows through the second LED block 2a connected in parallel to the second condenser 2c, the discharge current is prohibited from flowing into any other circuits through the second bypass switch 2s.

Since a weak current flows through the second condenser 2c at or below a threshold voltage of the second LED block 2a, the discharge of the second condenser 2c is weak, so that the voltage variation of the second condenser 2c is weak. In summary, when the power source current is not directly supplied to the LED block, the minimum voltage of the condenser for supplying the current to the LED block is the threshold voltage of the LED block.

Hereinafter, the operation of the circuit during the falling term (that is, between the voltage phases of 90° and (180°) of the rectified voltage will be described.

In FIGS. 4a-4b, since the third bypass switch 3s is open circuited, the power source current is directly supplied to the third light emitting block. The power source current passes through the third discharge-protection diode 3d and the third LED block 3a, and then, is provided to the next light emitting block.

Further, since the rectified voltage is decreased as the phase of the voltage is increased, the third condenser 3c is discharged through the third LED block 3a, so that the voltage of the third condenser 3c is decreased. [The current of the third LED block 3a=the discharge current of the third condenser 3c+the current of the third discharge protection diode 3d].

In FIGS. 4a-4b, since the fourth bypass switch 4s is short circuited, the current passing through the third light emitting block bypasses the fourth light emitting block. The current which is previously charged in the fourth condenser 4c is discharged through the fourth LED block 4a. Thus, even if the power source current is not directly provided, the fourth LED block 4a is turned on.

At this time, the fourth discharge protection diode 4d performs a function of allowing the discharge current of the fourth condenser 4c to flow only through the fourth LED block 4a connected in parallel with the fourth condenser 4c without flowing through the fourth switch 4s.

If the fourth discharge protection diode 4d does not exist, the fourth condenser 4c is rapidly discharged through the fourth bypass switch 4s.

That is, although the discharge current of the fourth condenser 4c flows through the fourth LED block 4a connected in parallel to the fourth condenser 4c, the discharge current is prohibited from flowing into any other circuits through the fourth bypass switch 4s.

Since a weak current flows through the fourth condenser 4c at or below a threshold voltage of the fourth LED block 4a, the discharge of the fourth condenser 4c is weak, so that the voltage variation of the fourth condenser 4c is weak. In summary, when the power source current is not directly supplied to the LED block, the minimum voltage of the condenser for supplying the current to the LED block is the threshold voltage of the LED block.

As described above, according to the present invention, even if the power source current is not directly supplied to the LED block, a current is provided from the condenser connected in parallel to the LED block to the LED block. That is, in the related art, when the supply of the power source current to the LED block is shut off, the light emission is zero, so that the modulation depth becomes 100%. However, in the present invention, the current is continuously supplied to the LED block, so that the modulation depth is improved.

Embodiment 1

In the first embodiment of the present invention, a computer simulation is performed with specific values.

In the simulation, the AC power source 1 in FIGS. 4a-4b is a 110 Vac/50 Hz power source, the current source CL has been set to output a sine wave having the maximum instantaneous current of 60 mA, and condensers of 10 uF have been used as the first to fourth condensers 1c to 4c.

In addition, the first to fourth LED blocks 1a to 4a have the same configuration. The current-voltage characteristics of the first LED block 1a and the first discharge protection diode 1d, which are connected to each other in series, are denoted in the following Table 1. This is similar with a case in which 10 white color LEDs are connected to each other in series with a forward voltage of 32.22 V (@ 20 mA).

TABLE 1

| Current [mA] | Voltage [V] |
| --- | --- |
| 0.1 | 10.5 |
| 0.2 | 19.9 |
| 0.5 | 24.31 |
| 1.0 | 25.85 |
| 2.0 | 27.27 |
| 5.0 | 29.25 |
| 10.0 | 30.73 |
| 20.0 | 32.22 |
| 50.0 | 34.22 |
| 60.0 | 34.63 |
| 100.0 | 35.78 |

When the current is 1 mA, the threshold voltage denoted as 'Voltage' in Table 1 is 25.85 V.

Specifically, since the forward voltage is 34.63 V when the current of 60 mA flows, the switching change has been set to be performed in multiples of 36 V.

That is, 1) the first switch 1s is open circuited and other switches are short circuited at the rectified voltage in the range of 0 V to 36 V, such that the power source current is directly provided to the first LED block 1a. Thus, the first switch 1s is always open.

2) Since the two LED blocks cannot be turned on at the rectified voltage in the range of 36 V to below 72 V, change of switching does not occur. That is, only the first switch 1s maintains a switching-off state.

3) When the rectified voltage is increased up to 72 V or above, the second switch 2s is immediately opened such that the power source current is provided to two LED blocks. That is, the power source current is provided to the first and second LED blocks 1a and 2a.

4) When the rectified voltage is increased up to 108 V or above, the third switch 3s is immediately opened such that the power source current is provided to three LED blocks. That is, the power source current is provided to the first to third LED blocks 1a to 3a.

5) Since the maximum rectified voltage is 141.4 V due to the AC voltage of 100 Vac, the rectified voltage is too low to drive four LED blocks (144 V=36×4). Thus, the fourth switch 4s always maintains a short state.

To the contrary, when the rectified voltage is decreased passing through 108 V or 72 V (that is, the phase term between 90° and (180°), the third and second switches 3s and 2s are switched on, respectively.

When the rectified voltage passes through 30 V, 36 V, 72 V and 108 V, the power source current (designed sine wave current), the phase of the power source voltage, the transit time before the voltage phase of 90°, and the transit time after the voltage phase of 90° are calculated by using a sine function as following Table 2.

TABLE 2

| Voltage [V] | Power source current [mA] | Power source voltage phase [Degree] | Time before 90° [ms] | Time after 90°[ms] |
| --- | --- | --- | --- | --- |
| 30.0 | 12.8 | 12.3 | 0.68 | 9.32 |
| 36.0 | 15.3 | 14.8 | 0.82 | 9.18 |
| 72.0 | 30.6 | 30.7 | 1.71 | 9.29 |
| 108.0 | 46.0 | 50.0 | 2.78 | 7.22 |

The computer simulation results under the above circuit condition are shown in FIGS. 5 to 9. FIGS. 5 to 9 are views showing the results during time from 180 ms to 195 ms after applying the power in which each condenser can be sufficiently charged with current.

Figure 5:
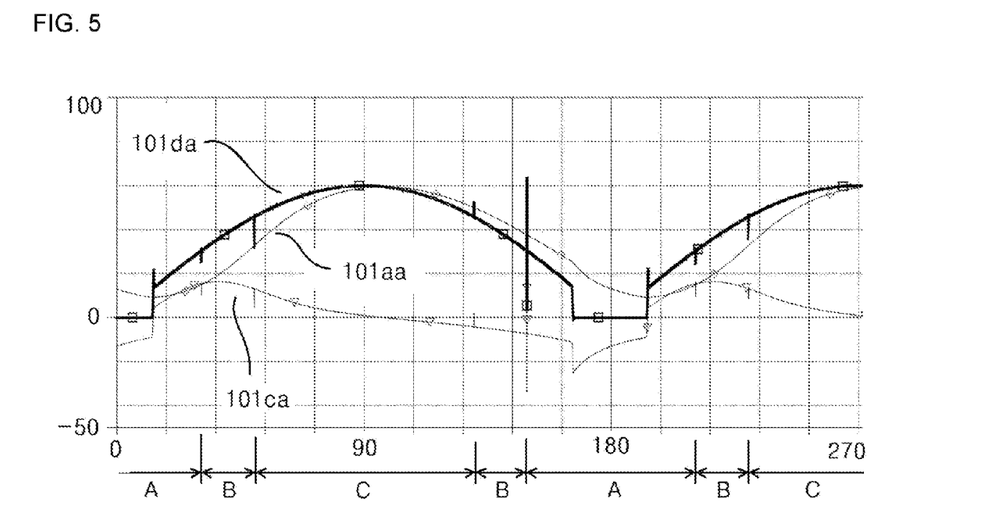
FIG. 5 is a view showing one example of a computer simulation result of a circuit according to the present invention.

FIG. 5 is a view showing a waveform according to the computer simulation result of the first light emitting block. The vertical axis denotes a current in units of mA, and the horizontal axis denotes a phase of AC voltage in units of degree. The phase angle may be expressed as 'ms', and one graduation denotes 1 ms corresponding to 50 Hz.

In FIG. 5, the first light emitting block is turned on during the term A, the first and second light emitting blocks are turned on during the term B, and the first to third light emitting blocks are turned on during the term C.

In the drawings described below, the description about the terms A to C will be omitted to avoid redundancy.

In FIG. 5, the current 101da passing through the first discharge protection diode 1d has the same amplitude as that of the power source current and symbols of both currents are positive (+). This corresponds to the current waveform 1AA of FIGS. 2a-2d disclosed in the related art.

The current 101da passing through the first discharge protection diode 1d has a spike current in the vicinity of 0.7 ms. The spike current occurs because the rectified voltage is higher than that of the first condenser 1c so that the power source current rapidly flows into the condenser.

Further, the rectified voltage has a spike current even at 72 V (time of 1.71 ms). This is because the number of LED blocks to which the power source current is directly provided is changed into two.

In addition, the rectified voltage has a spike current even at 108 V (time of 2.78 ms). This is because the number of LED blocks to which the power source current is directly provided is changed into three.

The power source current is directly provided only to the first light emitting block at the rectified voltage in the range of 36 V (time of 0.82 ms) to 72 V (time of 1.71 ms). Thus, although the rectified voltage is enough to allow the current of 100 mA (@ 35.78 V) or more to flow due to the load characteristic, the power source current is limited in the form of the sine waveform by the current source CL.

Further, the power source current is directly provided to two light emitting blocks at the rectified voltage in the range of 72 V (time of 1.71 ms) to 108 V (time of 2.78 ms). Thus, although the rectified voltage is enough to allow the current of 100 mA (@ 35.78×2 V) or more to flow due to the load characteristic, the power source current is limited in the form of the sine waveform by the current source CL.

Since three light emitting blocks are driven at the rectified voltage of 108 V (time of 2.78 ms) or more, the rectified voltage is enough to allow the current of 100 mA (@ 35.78×3 V) or more to flow due to the load characteristic, but the power source current is limited in the form of the sine waveform by the current source CL.

In FIG. 5, when the current 101ca of the first condenser 1c has a positive (+) value, the first condenser 1c is in charge.

When the current 101ca has a negative (−) value, the first condenser 1c is in discharge. The current 101aa of the first LED block 1a is not dropped into 0 (zero) and maintains a positive (+) value.

Therefore, even if the power source current is shut off, a current is continuously provided to the LED block so that light is continuously emitted, so the minimum light brightness is increased and the modulation depth is improved. That is, even if a plurality of LED blocks constitute the load and a condenser and a discharge protection diode are connected to only one of the LED blocks, the modulation depth is improved.

Figure 6:
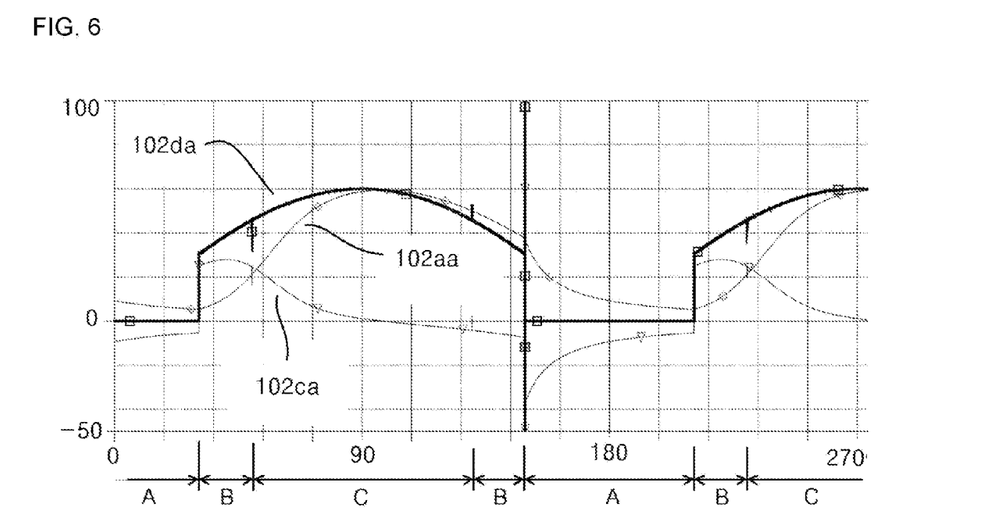
FIG. 6 is a view showing another example of a computer simulation result of a circuit according to the present invention.

FIG. 6 is a view showing a waveform of a simulation result of the second light emitting block. The current 102da passing through the second discharge protection diode 2d corresponds to the current waveform 2AA of FIGS. 2a-2d disclosed in the related art. FIG. 6 shows the second LED block currents 102aa and the second condenser current 102ca.

Figure 7:
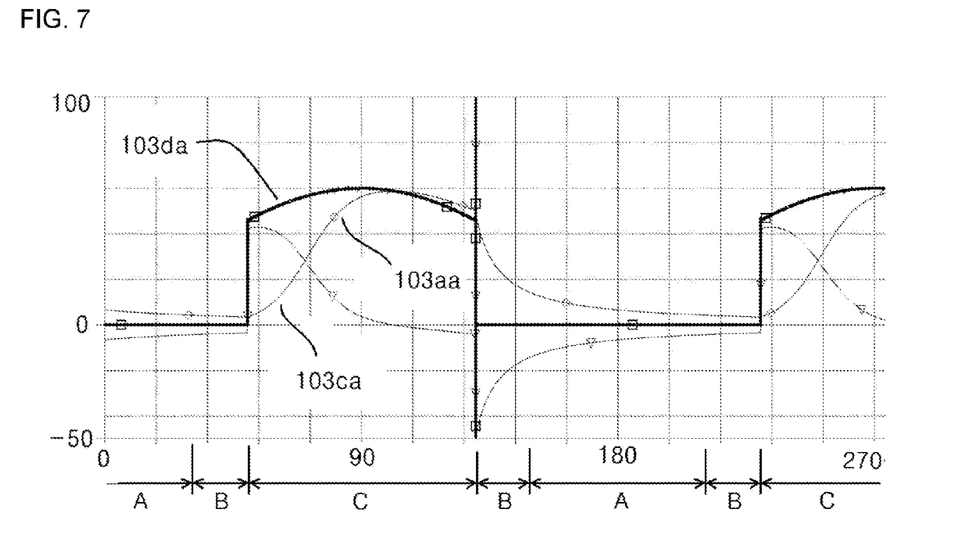
FIG. 7 is a view showing still another example of a computer simulation result of a circuit according to the present invention.

FIG. 7 is a view showing a waveform of a simulation result of the third light emitting block. The current 103da passing through the third discharge protection diode 3d corresponds to the current waveform 3AA of FIGS. 2a-2d disclosed in the related art. FIG. 7 shows the third LED block current 103aa and the third condenser current 103ca.

As shown in FIGS. 5 to 7, in the case of the first to third LED block currents 101aa to 103aa, the amount of the current in the term of the phase of 0° to 90° of the rectified voltage is lesser than the amount of the current in the term of the phase of 90° to 180°. That is, the brightness in the rising term of the rectified voltage is lower than that in the falling term of the rectified voltage.

In addition, even if only one of the first to third condensers 1c to 3c is used, the minimum instantaneous light brightness of the LED lighting device is increased, so that the modulation depth is improved. This is because the current charged in the condenser is provided to the LED block near the voltage phases of 0° and 180° at which the power source current does not flow, so that light is emitted.

Figure 8:
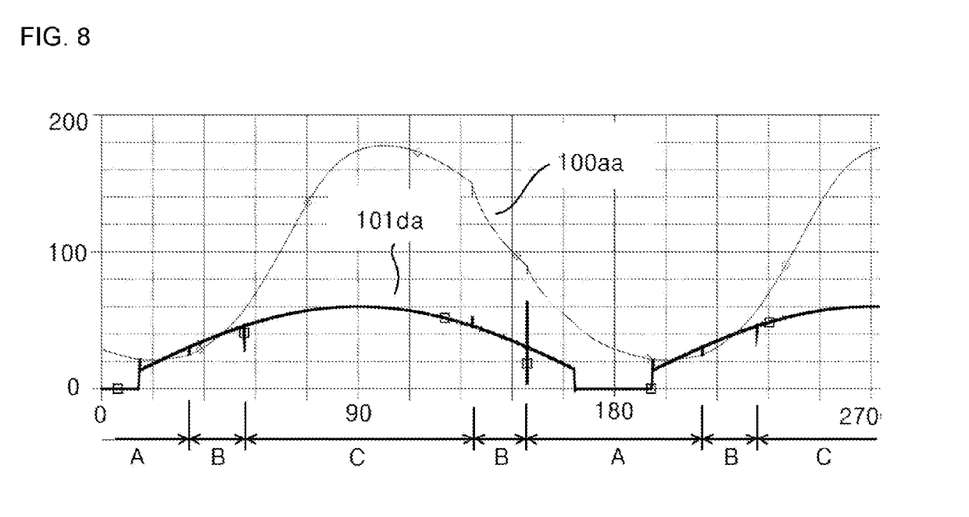
FIG. 8 is a view showing still another example of a computer simulation result of a circuit according to the present invention.

FIG. 8 is a view showing a computer simulation result obtained by combining the current of the first to third LED blocks 1a to 3a. Since the LED blocks are formed in the same configuration, the simulation result 100aa corresponds to the instantaneous brightness of the LED lighting device.

In the simulation results, the maximum value is about 180 and the minimum value is about 20. When the modulation depth is calculated with the values, the modulation depth becomes 80%. [(180−20)/(180+20)*100=80].

Figure 9:
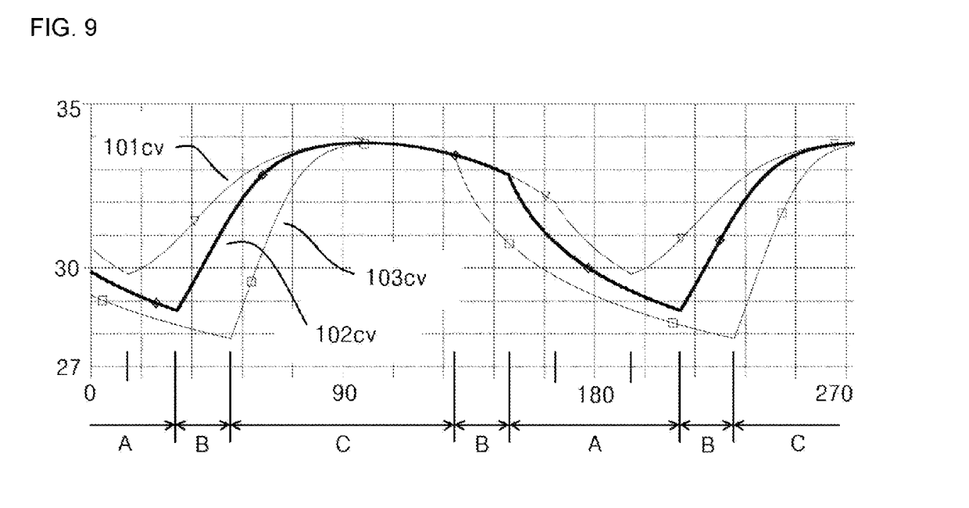
FIG. 9 is a view showing still another example of a computer simulation result of a circuit according to the present invention.

FIG. 9 is a view showing the voltages of the first to third condenser 1c to 3c when the computer simulation is performed under the above condition.

In FIG. 9, the maximum voltage of each condenser exists near the rectified voltage phase of 90°. To the contrary, the voltage is lowest when each condenser starts to be charged (that is, when the power source current is about to directly provided to the light emitting blocks).

Referring to the lowest voltage of the second condenser 2c, the second condenser voltage 102cv is about 29 V at the border between the terms A and B in the rising term of the rectified voltage (at the time that the supply of the power source current to two LED block starts while the power source current is directly provided to one LED block).

The second condenser voltage 102cv is about 33 V at the border between the terms A and B in the falling term of the rectified voltage (at the time that the direct supply of the power source current to one LED block starts while the power source current is directly provided to two LED block).

Therefore, it is preferable that the switch change reference voltage (low value) which bypasses each light emitting block in the rising term of the rectified voltage is different from the switch change reference voltage (high value) which bypasses each light emitting block in the falling term of the rectified voltage.

In addition, when the switch change reference voltages (for example, the voltage which is set slightly higher than the sum of maximum voltages of the condensers by taking the saturation voltage of the current source and the forward voltage of the discharge protection diode into consideration) are set as multiples of the reference values, the circuit that generates the reference voltage and the circuit that determines the switch change may be simplified.

The first embodiment of the present invention has been described above.

Embodiment 2

The second embodiment of the present invention is a computer simulation result in which the capacitances of the first to fourth condensers 1c to 4c of the first embodiment are changed into 47 uF.

Figure 10:
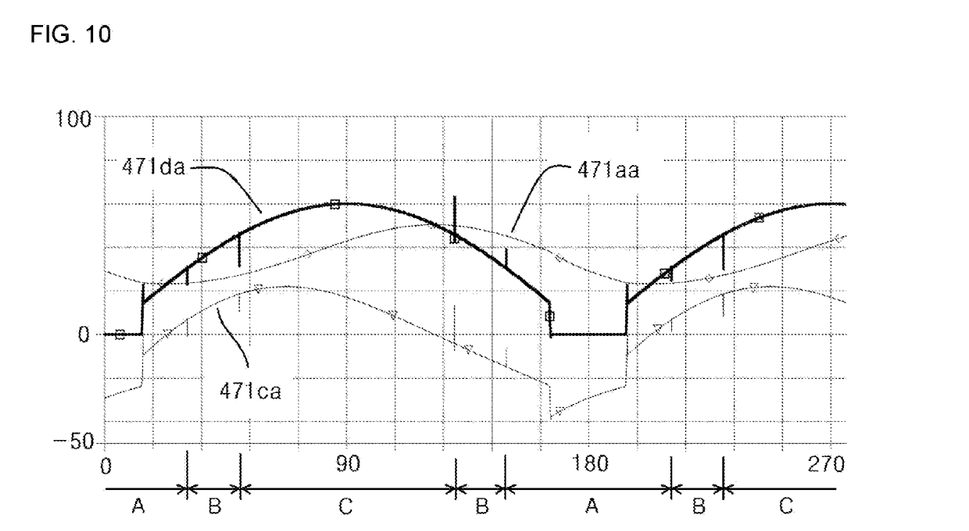
FIG. 10 is a view showing still another example of a computer simulation result of a circuit according to the present invention.

FIG. 10 is a view showing a waveform of the simulation result of the first light emitting block.

In FIG. 10, the current 471da passing through the first discharge protection diode 1d corresponds to the current waveform 1AA of FIGS. 2a-2d disclosed in the related art. FIG. 10 shows the first LED block currents 471aa and the first condenser current 471ca.

In FIG. 5 (wherein the 10 uF condenser is used), the first LED block current 101aa has the maximum value (about 60 mA) near the voltage phase of 90°. To the contrary, in FIG. 10 (wherein the 47 uF condenser is used), the first LED block current 471aa has the maximum value (about 50 mA) near the voltage phase of 125° (near 7 ms, 50 Hz).

Thus, it may be understood that if the capacity of the first condenser 1c is increased, the maximum value of the instantaneous current of the first LED block 1a is lowered.

Since the modulation depth is improved as the difference between the instantaneous maximum and minimum values is reduced, the modulation depth can be improved by reducing the maximum instantaneous current.

Further, the amount of current discharged from the condenser near the voltage phase of 180° is increased as the capacity of the condenser is increased, so that the minimum instantaneous value is increased, so the modulation depth is improved.

Figure 11:
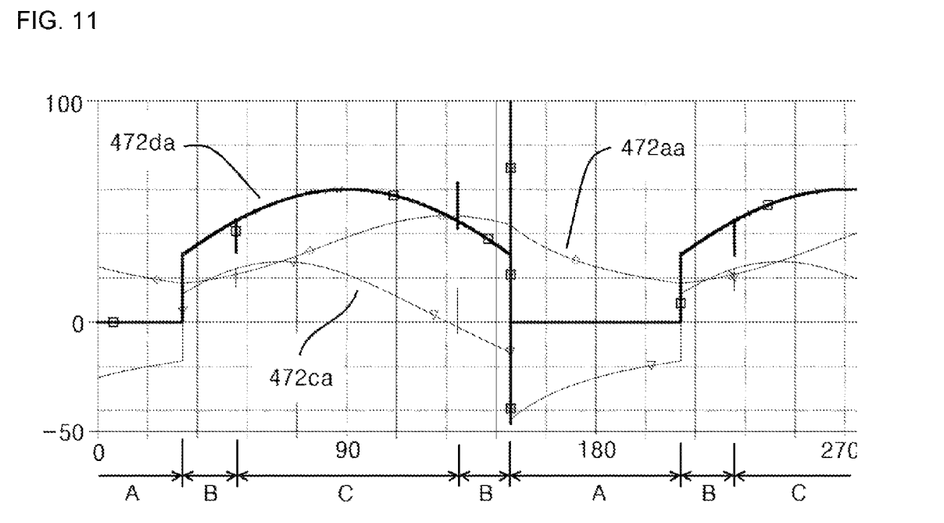
FIG. 11 is a view showing still another example of a computer simulation result of a circuit according to the present invention.

FIG. 11 is a view showing a waveform of the simulation result of the second light emitting block.

In FIG. 11, the current 472da passing through the second discharge protection diode 2d corresponds to the current waveform 2AA of FIGS. 2a-2d disclosed in the related art. FIG. 11 shows the second LED block currents 472aa and the second condenser current 472ca.

Figure 12:
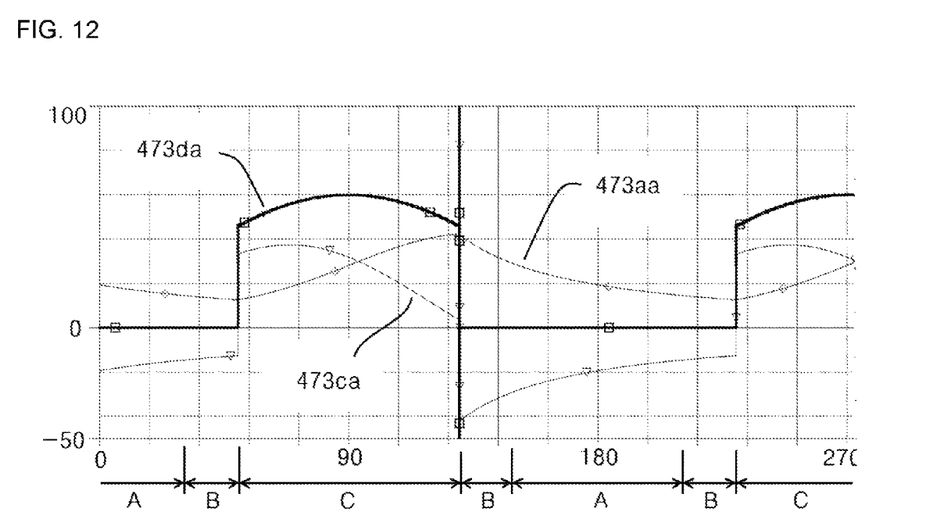
FIG. 12 is a view showing still another example of a computer simulation result of a circuit according to the present invention.

FIG. 12 is a view showing a waveform of the simulation result of the third light emitting block.

In FIG. 12, the current 473da passing through the third discharge protection diode 3d corresponds to the current waveform 3AA of FIGS. 2a-2d disclosed in the related art. FIG. 12 shows the third LED block currents 473aa and the third condenser current 473ca.

As shown in FIGS. 10 to 12, the first to third LED block currents 471aa to 473aa in the rising term of the rectified voltage are almost equal to those of the falling term of the rectified voltage. In detail, the current amounts in the rising term are slightly greater than those in the falling term.

Figure 13:
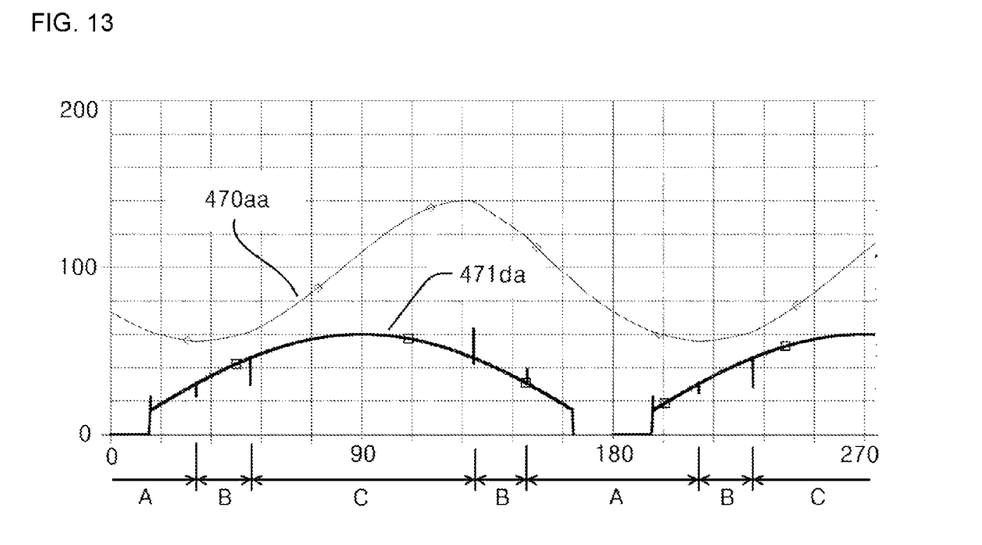
FIG. 13 is a view showing still another example of a computer simulation result of a circuit according to the present invention.

FIG. 13 is a view showing a computer simulation result 470aa obtained by combining the current of the first to third LED blocks 1a to 3a.

Since the LED blocks are formed in the same configuration, the simulation result 470aa corresponds to the instantaneous brightness of the LED lighting device.

In the simulation results 470aa, the maximum value is about 140 and the minimum value is about 60. When the modulation depth is calculated with the values, the modulation depth becomes 40%. [(140−60)/(140+60)*100=40].

Figure 14:
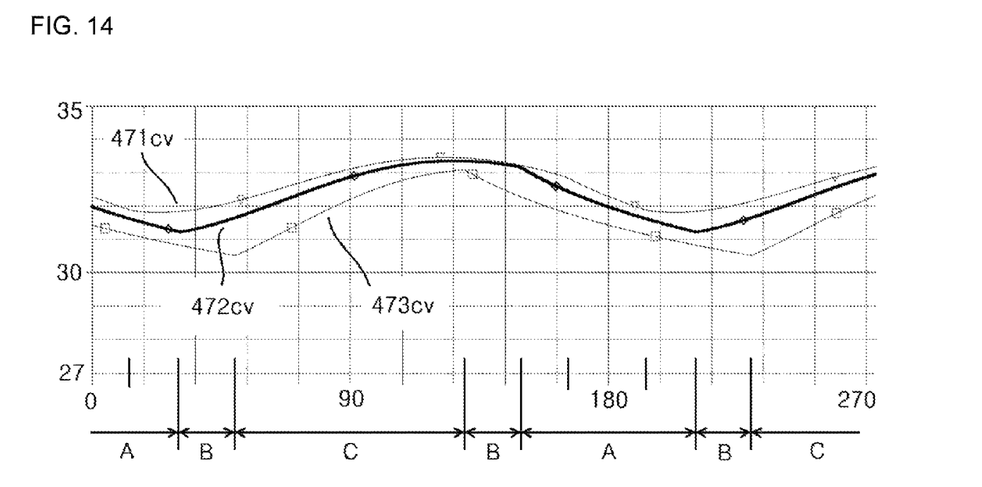
FIG. 14 is a view showing still another example of a computer simulation result of a circuit according to the present invention.

FIG. 14 is a view showing the voltages of the first to third condenser 1c to 3c when the computer simulation is performed under the above condition.

In FIG. 14, the maximum voltage of each condenser exists near the rectified voltage phase of 125° (near 7 ms, 50 Hz). The voltage is lowest when each condenser starts to be charged (that is, when the power source current is about to directly provided to the light emitting blocks).

Referring to the lowest voltage of the second condenser 2c, the second condenser voltage 472cv is about 31 V at the border between the terms A and B in the rising term of the rectified voltage (at the time that the supply of the power source current to two LED block starts while the power source current is directly provided to one LED block).

The second condenser voltage 472cv is about 33 V at the border between the terms A and B in the falling term of the rectified voltage (at the time that the direct supply of the power source current to one LED block starts while the power source current is directly provided to two LED block).

Therefore, it is preferable that the switch change reference voltage (low value) which bypasses each light emitting block in the rising term of the rectified voltage is different from the switch change reference voltage (high value) which bypasses each light emitting block in the falling term of the rectified voltage.

In addition, when the switch change reference voltages (for example, the voltage which is set slightly higher than the sum of maximum voltages of the condensers by taking the saturation voltage of the current source and the forward voltage of the discharge protection diode into consideration) are set as multiples of the reference values, the circuit that generates the reference voltage and the circuit that determines the switch change may be simplified.

The second embodiment of the present invention has been described above.

Embodiment 3

The third embodiment according to the present invention is implemented with a switch block in which switches are disposed in parallel.

Hereinafter, the exemplary embodiment of the present invention including the switches disposed in parallel will be described with reference to FIG. 15.

Figure 15:
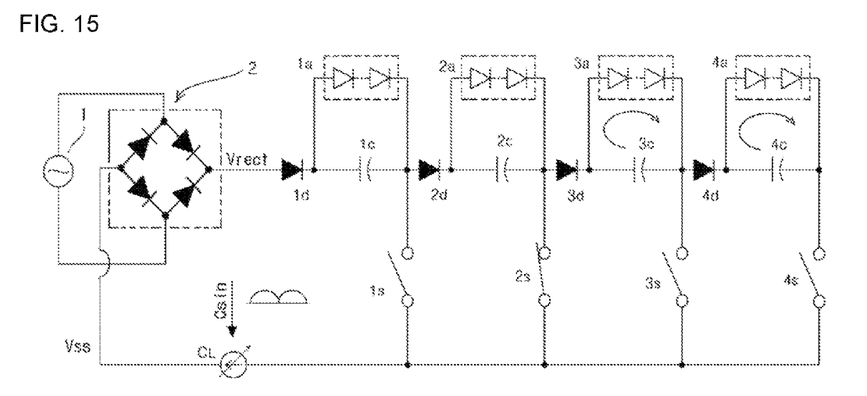
FIG. 15 is a circuit view according to another example of the present invention.

As shown in FIG. 15, the present invention includes an AC power source 1 for supplying an AC voltage, a rectifier circuit 2 for rectifying the AC voltage, and first to fourth LED blocks 1a to 4a serving as a load Specifically, the LED lighting device includes first to fourth condensers 1c to 4c connected in parallel to each other and the first to fourth discharge-protection diodes 1d to 4d for protecting the currents from flowing through other circuits except for the LED blocks when the condensers are discharged.

Further, the LED lighting device includes a parallel-disposed switch block having the first to fourth bypass switches 1s to 4s and a current source CL for limiting an amount of power current. The bypass switches are connected between the cathodes of the LED block and the positive (+) voltage terminal of the current source CL, respectively. The LED blocks and the current source CL are connected sequentially and in series between a rectified voltage Vrect and the ground Vss.

A circuit including the first LED block 1a, the first discharge-protection diode 1d and the first condenser 1c is called "the first light emitting block". Likewise, other circuits are called "the second light emitting block", "the third light emitting block", and "the fourth light emitting block".

If general, the circuit including the $N^{th}$ LED block Na, the $N^{th}$ discharge-protection diode Nd and the $N^{th}$ condenser Nc may be called "the $N^{th}$ light emitting block". Further, "the first light emitting block" to "the $N^{th}$ light emitting block" connected to each other in series are called loads.

Hereinafter, the operation of the circuit will be described with reference to FIG. 15.

First, the parallel-disposed switch block allows one switch to be turned on and the other switches to be turned off at a moment in time.

As one example, when the first switch 1s is only turned on, the first LED block 1a is only connected between the rectifier circuit 2 and the current source CL, so that the power source current is directly provided to the first LED block 1a.

At this time, the first condenser 1c is charged or discharged when the rectified voltage is increased or decreased. The current of other condensers (the second to fourth condensers) is discharged into each LED block connected in parallel to the condensers.

Since the condenser discharge current is prevented from flowing into other circuits except for the LED block by the discharge protection diode, the condenser discharge current is discharged into the LED block connected in parallel to the condenser.

Figure 16:
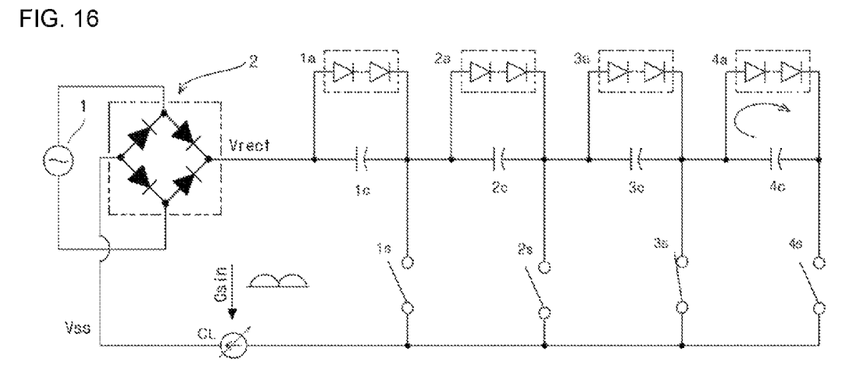
FIG. 16 is a circuit view according to still another example of the present invention.

However, as shown in FIG. 15, since each condenser cannot form a closed loop circuit without each LED block connected in parallel to the condenser, a discharge protection diode is not required (a resultant circuit is depicted in FIG. 16).

Thus, in the present invention, the discharge protection diode described in the first and second embodiments may be preferably referred to as a discharge protection circuit.

In the circuit of FIG. 15, the current of the fourth condenser 4c is discharged into the fourth LED block 4c without the last switch, that is, the fourth switch 4s (that is, a short circuit). This is because the fourth discharge protection diode 4d is operated so that the discharge current of the fourth condenser 4c is prevented from flowing into another circuit.

However, in the circuit of FIG. 16 in which all discharge protection diodes are removed, if the fourth switch 4s does not exist, the discharge current of the fourth condenser 4c may flow through the third switch 3s. In the circuit of FIG. 16, the fourth switch 4s serving as a discharge protection circuit is necessarily required. A diode which is a unidirectional switch may substitute for the fourth switch 4s.

Since the current source CL for limiting a current, the rectifier circuit 2 and the configurations of each LED block have already been described above, the detail descriptions thereof will be omitted below.

The third embodiment of the present invention has been described above.

Embodiment 4

The fourth embodiment according to the present invention is different from the above-described embodiments in terms of the disposition of condensers which are disposed in parallel with LED blocks.

Hereinafter, the exemplary embodiment of the present invention including the condensers disposed in parallel will be described with reference to FIG. 17.

Figure 17:
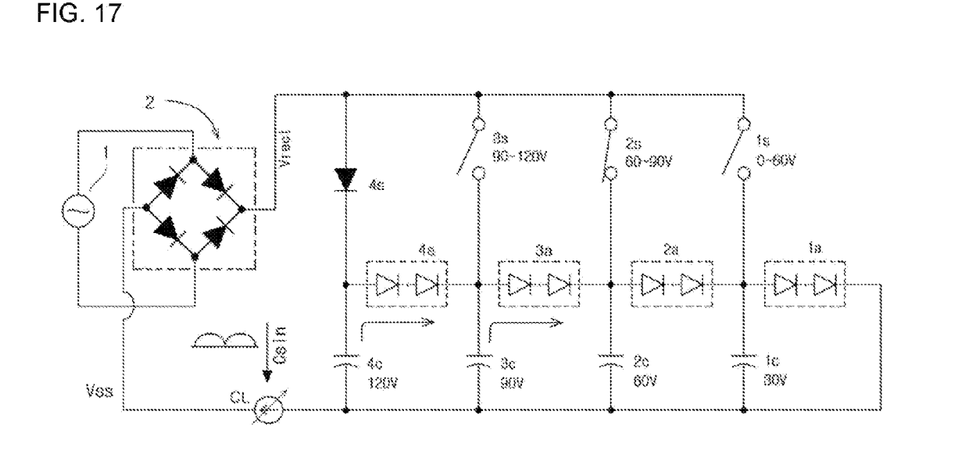
FIG. 17 is a circuit view according to still another example of the present invention.

As shown in FIG. 17, the present invention includes an AC power source 1 for supplying an AC voltage, a rectifier circuit 2 for rectifying the AC voltage, and the first to fourth LED blocks 1a to 4a connected in series to each other to serve as a load.

Specifically, the LED lighting device includes first to fourth condensers 1c to 4c connected between the anodes of the each LED block and the positive voltage terminal of a current source CL (that is, connected in parallel to the LED blocks) and the first to fourth bypass switches 1s to 4s for connecting the rectified voltage Vrect, which is an output of the rectifier circuit 2, to the anodes of each LED blocks.

Further, the LED lighting device includes the current source CL for limiting an amount of a power source current. The LED blocks and the current source CL are connected to each other in series and connected between a rectified voltage Vrect and the ground Vss.

A circuit including the first LED block 1a, and the first condenser 1c is called "the first light emitting block". Likewise, other circuits are called "the second light emitting block", "the third light emitting block", and "the fourth light emitting block".

In general, the circuit including the $N^{th}$ LED block Na, and the $N^{th}$ condenser Nc may be called "the $N^{th}$ light emitting block".

Hereinafter, the operation of the circuit will be described with reference to FIG. 17.

First, the parallel-disposed switch block allows one switch to be turned on and the other switches to be turned off at a moment in time. The fourth switch 4s may be implemented with a diode serving as a unidirectional switch.

As one example, when the second switch 2s is only turned on, the first and second LED blocks 1a and 2a are connected between the rectified voltage Vrect and the current source CL. Thus, the power source current is directly provided to the first and second LED blocks 1a and 2a.

At this time, the first and second condensers 1c and 2c are charged or discharged when the rectified voltage is increased or decreased. The current of other condensers (the third and fourth condensers) is discharged into the LED blocks connected in parallel to the condensers, respectively.

Since the third switch 3c is open, the discharge current of the third condenser 3c is discharged into the third LED block 3a. Since the fourth switch 4s is reverse-biased, the discharge current of the fourth condenser 4c is discharged into the fourth LED block 4a.

For example, if it is assumed that the maximum voltages of each LED block are 30 V, the fourth condenser 4c is charged with the rectified voltage of about 120 V after several cycles elapse. As shown in FIG. 17, since the rectified voltage is in the range of 60 V to 90 V, the fourth switch 4s is shut off.

That is, the circuit is configured to prevent the discharge currents of the condensers from flowing into other circuits through the bypass switches while allowing the discharge currents to flow into each of the LED blocks connected in parallel with the condensers.

Since the current source CL for limiting a current, the rectifier circuit 2 and the configurations of each LED block have already been described above, the detail descriptions thereof will be omitted below.

The fourth embodiment of the present invention has been described above.

Embodiment 5

According to the fifth embodiment of the present invention, when the power source current is not supplied, the condenser which provides a current to an LED block is forcibly discharged or the discharge of the current from the condenser into the LED block is shut off.

It is preferable that the LED lighting device is immediately turned off when the AC voltage is shut off. However, the present invention provides a condenser which provides the current charged therein by the power source current to the LED block connected in parallel to the condenser when the power source current is not supplied thereto.

Thus, if the capacity of the condenser is small, the condenser is discharged in a short time after the AC voltage is shut off, so that the LED lighting device is immediately turned off. However, if a large capacity of condenser is used in order to improve the modulation depth, the discharge is performed for a long time.

Figure 18A:
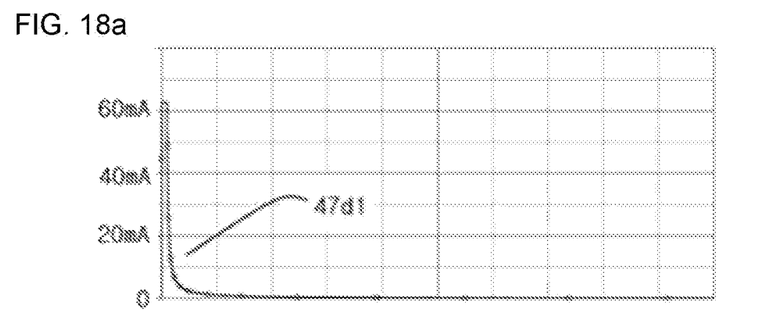
FIGS. 18a-18c show a computer simulation result for discharge characteristics of a condenser.
Figure 18B:
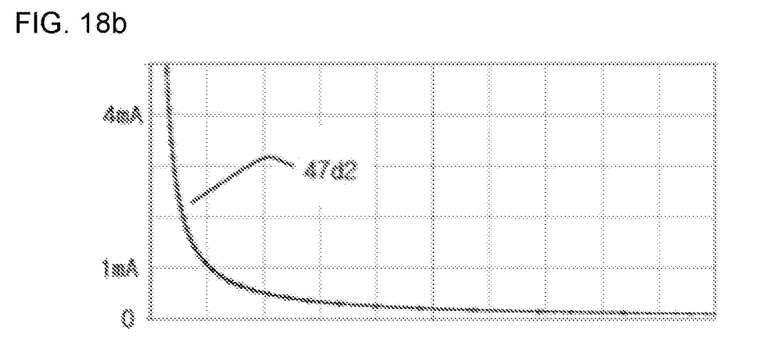
Figure 18C:
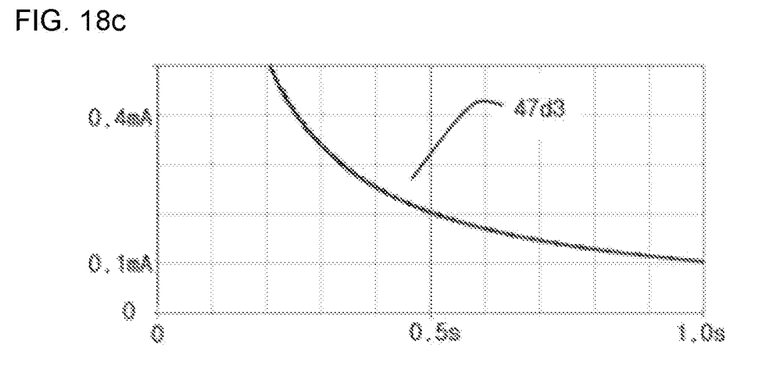

FIGS. 18a-18c show a computer simulation result for discharge characteristics of a condenser.

In the present simulation, a condenser of 47 uF has been charged with 34 V for 10 ms, and the current has started to be discharged into the LED block having the characteristics denoted in Table 1. The LED block discharge current has been recorded based on elapsed time.

In FIGS. 18a-18c, the first to third discharge current waveforms 47d1 to 47d3 are the same discharge current. The waveforms are denoted differently from each other in scale. The first discharge current waveform 47d1 is shown in an actual scale. The second and third discharge current waveforms 47d2 and 47d3 are shown in an enlarged scale in order to observe the discharge current at a low level.

In the first to third discharge current waveforms 47d1 to 47d3, although the discharge current of 60 mA or more flows at the initial stage, the discharge current is reduced to 1 mA after the time of 0.1 second is elapsed. After 1 second, the discharge current becomes 0.1 mA.

This is because the current is exponentially decreased as the voltage is lowered and the time taken to reduce the condenser voltage is exponentially increased due to the LED characteristics.

Due to LED characteristics, the LED emits light although a slight current flows through the LED. In general, if the current of about 0.1 mA flows through the LED, the light emission can be barely recognized to the naked eye in a general office working environment.

However, since the lighting device flashes a dark place, the light emitted by the current of 0.1 mA may be sufficient to flash the dark place. Similarly, for example, although the brightness to the degree of the glow of a firefly is not recognized in the daytime, but can be recognized at night.

As shown in FIGS. 18a-18c, when the current of the condenser is discharged into the LED block, the current of 0.1 mA flows through the LED block even if 1 second has elapsed after the AC voltage is shut off. Thus, a person can recognize the weak light of the LED lighting device at night.

Therefore, it is preferable that the LED lighting device includes a circuit for forcibly discharging the condenser when a predetermined time (for example, time corresponding to 5 rectifying cycles) is elapsed after the AC voltage is shut off. The LED lighting device may include a circuit for forcibly shutting off the current supplied from the condenser to the LED block by separating the condenser and the LED block from each other.

In another scheme, when the condenser voltage is reduced at a predetermined value or less as the AC voltage is shut off to reduce the condenser voltage, the LED lighting device preferably includes a circuit for forcibly discharging the condenser. As one example, when the condenser voltage becomes 25 V (since each condenser voltage is in the range of about 27

V to about 34 V) in FIG. 9 and the condenser voltage becomes 28 V (since each condenser voltage is in the range of about 30 V to about 34 V) in FIG. 14, the condenser is forcibly discharged.

In this case, the LED lighting device preferably includes a circuit for shutting off the current supply from the condenser to the LED block by separating the condenser from the LED block connected in parallel to the condenser.

As one example, the discharge circuit can be implemented by using a reset circuit of a microprocessor and the shut-off circuit can be implemented by using an over-discharge protection circuit for a lithium ion battery. Thus, the detail description about the discharge circuit and the shut-off circuit will be omitted.

The fifth embodiment of the present invention has been described above.

Although a spike current is introduced several tens of thousands times per second in a conventional switch-mode power supply (hereinafter, referred to as "SMPS") because SMPS has a driving frequency of several tens KHz, the spike current is introduced several hundred times per second in the LED lighting device according to the present invention.

Thus, according to the present invention, an inner temperature of the condenser is relatively low. Further, since the current charge and discharge of the condenser is slowly performed over a long time, the durability of the condenser is longer than that of the conventional SMPS.

In the specification of the present invention, the embodiments including 4 LED blocks and 4 switches have been shown and described. However, it is obvious that the present invention may be implemented with the various numbers of LED blocks and switches.

Further, the switch block including switches connected in series with each other and the switch block including switches connected in parallel with each other have been described as examples. Referring to the related art disclosed in the specification, it is obvious to those skilled in the art that the present invention may be implemented with a switch block including switches connected in series and parallel with each other.

Further, it has been described in the specification that the current source CL for limiting a power source current is controlled by using a sine waveform signal having the same phase as that of the AC voltage. However, it is obvious that the present invention may be implemented by controlling the current source CL to generate the power source current having a step form (hereinafter, referred to as "step waveform current") as soon as the switch of the switch block is switched (that is, the power source current having the number of steps as many as the number of switches).

In this case, it is obvious to interpret the step waveform current following a sine wave as the sine waveform current having the same phase as that of the AC voltage regardless of the switching change of the switch block by controlling the current source CL which controls the power source current (that is, a power source current having stairs greater than the number of switches).

Further, it is obviously understood that the controller (not shown) generates a sine wave (hereinafter, referred to as "sine wave 2") having a frequency lower than a rectifying frequency, the sine wave 2 has the maximum instantaneous voltage at the phase 90° of the rectified voltage, and the current source CL is controlled to supply the current corresponding to the sine wave 2 signal to the load by using the sine wave signal having the phase the same as that of the AC voltage.

Although preferred embodiments of the present invention have been described above, the present invention may be variously modified without departing from the spirit and the main features of the present invention. Thus, the above-described embodiments are illustrative purposes only and the present invention is not limited to such embodiments. The scope of the present invention is defined by the claims without being restricted to the contents of the specification. In addition, all modifications and changes to the claims may fall within the scope of the present invention.

What is claimed is:

1. An LED lighting device having an improved modulation depth, the LED lighting device comprising:
    a rectifier circuit for converting an AC voltage into a rectified DC voltage by rectifying the AC voltage;
    at least one LED block;
    at least one light emitting block including a condenser connected in parallel to the LED block;
    a current source for limiting a current provided to the light emitting blocks connected to each other in series;
    a switch block including at least one switch for bypassing a current flowing through the light emitting block; and
    a controller for controlling the switch block and the current source,
    wherein the LED lighting device comprises a circuit configured to allow a discharge current of the condenser to flow into the LED block and to prevent the discharge current from flowing into other circuits through the switch.

2. The LED lighting device of claim 1, wherein the controller controls the current source by using a sine wave signal having a phase equal to a phase of the AC voltage.

3. The LED lighting device of claim 1, wherein the controller changes a control amount of the current source in order to provide a step waveform current to the light emitting block when the switch of the switch block is switched.

4. The LED lighting device of claim 1, further comprising:
    a discharge circuit for forcibly discharging the condenser when the AC voltage is shut off.

5. The LED lighting device of claim 1, further comprising:
    a shut-off circuit for shutting off a current supplied into the LED block by separating the condenser from the LED block connected in parallel to the condenser when the AC voltage is shut off.

6. The LED lighting device of claim 1, wherein the switch of the switch block is connected in series, parallel or series-parallel to the LED block.

7. The LED lighting device of claim 2, wherein the switch of the switch block is connected in series, parallel or series-parallel to the LED block.

8. The LED lighting device of claim 3, wherein the switch of the switch block is connected in series, parallel or series-parallel to the LED block.

9. The LED lighting device of claim 4, wherein the switch of the switch block is connected in series, parallel or series-parallel to the LED block.

10. The LED lighting device of claim 5, wherein the switch of the switch block is connected in series, parallel or series-parallel to the LED block.

* * * * *